(12) United States Patent
Lee

(10) Patent No.: US 11,606,603 B2
(45) Date of Patent: Mar. 14, 2023

(54) DISPLAY APPARATUS AND CONTROLLING METHOD THEREOF

(71) Applicant: SAMSUNG ELECTRONICS CO., LTD., Suwon-si (KR)

(72) Inventor: Young Ho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 119 days.

(21) Appl. No.: 16/965,648

(22) PCT Filed: Jan. 17, 2019

(86) PCT No.: PCT/KR2019/000669
§ 371 (c)(1),
(2) Date: Jul. 29, 2020

(87) PCT Pub. No.: WO2019/156380
PCT Pub. Date: Aug. 15, 2019

(65) Prior Publication Data
US 2021/0044862 A1 Feb. 11, 2021

(30) Foreign Application Priority Data
Feb. 9, 2018 (KR) ........................ 10-2018-0016417

(51) Int. Cl.
*H04N 21/4402* (2011.01)
*H04N 21/485* (2011.01)
*H04N 21/84* (2011.01)

(52) U.S. Cl.
CPC ....... *H04N 21/4402* (2013.01); *H04N 21/485* (2013.01); *H04N 21/84* (2013.01)

(58) Field of Classification Search
CPC ............. H04N 21/4402; H04N 21/485; H04N 7/0127; H04N 21/4318; H04N 21/440281;
(Continued)

(56) References Cited

U.S. PATENT DOCUMENTS

| 8,174,614 | B2 | 5/2012 | Asamura et al. |
| 8,319,887 | B2 | 11/2012 | Hamada et al. |

(Continued)

FOREIGN PATENT DOCUMENTS

| JP | 2010-263468 A | 11/2010 |
| KR | 10-0219145 B1 | 9/1999 |

(Continued)

OTHER PUBLICATIONS

International Search Report (PCT/ISA/210), issued by International Searching Authority in corresponding International Application No. PCT/KR2019/000669, dated May 17, 2019.
(Continued)

*Primary Examiner* — Kunal Langhnoja
(74) *Attorney, Agent, or Firm* — Sughrue Mion, PLLC

(57) ABSTRACT

A display apparatus and a controlling method thereof provides an optimal viewing environment to a user by differently applying image processing parameters related to image processing time according to content types of input images. A display apparatus according to an embodiment includes an input interface receiving an input image; and a controller configured to determine an image processing parameter based on characteristics of the input image, and control an image processing time for the input image to be determined in response to the determined image processing parameter.

12 Claims, 20 Drawing Sheets

(58) Field of Classification Search
CPC .............. H04N 21/4854; H04N 21/84; H04N 21/44008; H04N 21/44029; H04N 21/4782
See application file for complete search history.

(56) References Cited

U.S. PATENT DOCUMENTS

| | | | |
|---|---|---|---|
| 2010/0013988 A1* | 1/2010 | Hulyalkar | H04N 7/0135 348/569 |
| 2011/0004911 A1* | 1/2011 | Kabuto | H04N 21/4363 725/115 |
| 2017/0064389 A1* | 3/2017 | Teramoto | H04N 21/43632 |

FOREIGN PATENT DOCUMENTS

| | | |
|---|---|---|
| KR | 10-2001-0073388 A | 8/2001 |
| KR | 10-2007-0089417 A | 8/2007 |
| KR | 10-2014-0020807 A | 2/2010 |

OTHER PUBLICATIONS

Communication dated Sep. 14, 2022, issued by the Korean Intellectual Property Office in Korean English Application No. 10-2018-0016417.

\* cited by examiner

VANISHING POINT DETECTION

VANISHING POINT AND HORIZONTAL LINE DETECTION

DISPLAY APPARATUS AND CONTROLLING METHOD THEREOF

CROSS REFERENCE TO RELATED APPLICATIONS

This application is a National Stage of International Application No. PCT/KR2019/000669 filed Jan. 17, 2019 claiming priority from Korean Patent Application No. 10-2018-0016417 filed on Feb. 9, 2018 and the disclosures of which are incorporated herein in their entirety by reference.

TECHNICAL FIELD

Embodiments of the disclosure relate to a display apparatus and a controlling method thereof to reproduce various contents such as games, broadcasts, videos, and the like.

BACKGROUND ART

A display apparatus may perform image processing according to various algorithms to improve image quality of a reproduced image.

In particular, the display apparatus can apply a temporal image interpolation algorithm such as frame rate conversion (FRC) among image processing algorithms to improve the motion blur phenomenon that appears in a video and express a natural motion to realize a high-quality image.

In order to perform the temporal image interpolation algorithm, another frame temporally adjacent to the frame to be processed is used. At this time, as the number of other frames used increases, the image quality of the image improves, but an image processing time increases, which may result in a frame delay occurring.

DISCLOSURE

Technical Problem

One aspect provides a display apparatus and a control method thereof capable of providing an optimal viewing environment to a user by differently applying image processing parameters related to an image processing time according to content types of input images.

Technical Solution

In accordance with an aspect of the disclosure, a display apparatus comprises an input interface receiving an input image; and a controller configured to determine an image processing parameter based on characteristics of the input image, and control an image processing time for the input image to be determined in response to the determined image processing parameter.

The controller may determine a content type of the input image based on the characteristics of the input image, and determine the image processing parameter based on the determined content type.

When the content type of the input image is a game, the controller may determine the image processing parameter such that the image processing time is shorter than when the content type of the input image is a normal video rather than the game.

When the content type of the input image is a game, the controller may determine a game genre of the input image based on the characteristics of the input image.

The controller may determine the image processing parameter related to the image processing time based on the game genre of the input image.

The controller may determine the input image is a sports broadcast based on the characteristics of the input image when the content type of the input image is the normal video, and determine the image processing parameter such that the image processing time is shorter than when the input image is not the sports broadcast when the input image is the sports broadcast.

The controller may perform the image processing according to a Frame Rate Conversion algorithm, and the image processing parameter related to the image processing time may include the number of reference frames used to generate an interpolation frame.

The controller may determine the number of the reference frames to be smaller than when the content type of the input image is the normal image when the content type of the input image is the game.

The controller may determine the number of the reference frames to be less than or equal to a predetermined first reference value when the content type of the input image is the game.

The controller may determine the number of the reference frames to be greater than or equal to a predetermined first reference value when the content type of the input image is not the game.

The display apparatus further comprises a user input for receiving a selection of the image processing parameter related to the image processing time from a user.

The display apparatus further comprises a display for displaying the input image on which image processing has been performed.

In accordance with an aspect of the disclosure, a control method of a display apparatus may comprise: receiving an input image; determining an image processing parameter related to an image processing time based on characteristics of the input image; and controlling the image processing time for the input image to be determined in response to the determined image processing parameter.

The determining the image processing parameter, when a content type of the input image is a game, may determine the image processing parameter such that the image processing time is shorter than when the content type of the input image is a normal video rather than the game.

The determining the content type of the input image further comprises, when the content type of the input image is a game, determining a game genre of the input image based on the characteristics of the input image.

The determining the image processing parameter may determine the image processing parameter related to the image processing time based on the game genre of the input image.

The determining the image processing parameter may determine the input image is a sports broadcast based on the characteristics of the input image when the content type of the input image is the normal video, and determine the image processing parameter such that the image processing time is shorter than when the input image is not the sports broadcast when the input image is the sports broadcast.

The image processing parameter related to the image processing time may include the number of reference frames used to generate an interpolation frame.

The determining the image processing parameter may determine the number of the reference frames to be smaller than when the content type of the input image is the normal image when the content type of the input image is the game.

The determining the image processing parameter may determine the number of the reference frames to be less than or equal to a predetermined first reference value when the content type of the input image is the game.

The determining the image processing parameter may determine the number of the reference frames to be greater than or equal to a predetermined first reference value when the content type of the input image is not the game.

The method may further include receiving a selection of the image processing parameter related to the image processing time from a user.

Advantageous Effects

According to a display apparatus and a control method thereof, it is possible to provide an optimal viewing environment to the user by adjusting the processing time required for image processing according to the characteristics of the input image.

MODE FOR INVENTION

Figure 1:
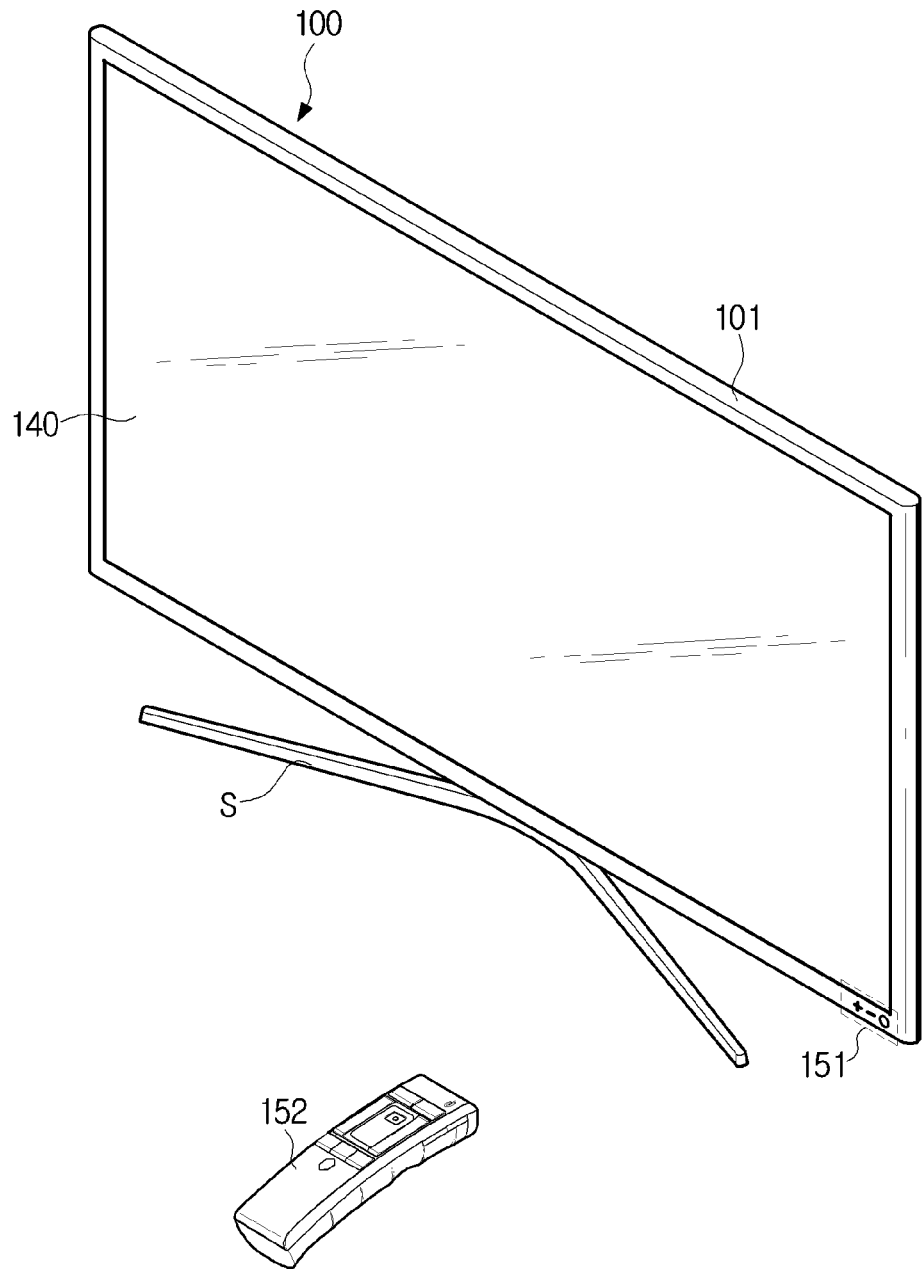
FIG. 1 is a view illustrating an appearance of a display apparatus according to an embodiment of the present disclosure.

In the following description, like reference numerals refer to like elements throughout the specification. This specification does not describe all elements of the embodiments, and in the technical field to which the present invention pertains, there is no overlap between the general contents or the embodiments. Terms such as "unit," "module," "member," and "block" may be embodied as hardware or software. According to embodiments, a plurality of "units," "modules," "members," or "blocks" may be implemented as a single component or a single "unit," "module," "member," or "block" may include a plurality of components.

In all specifications, it will be understood that when an element is referred to as being "connected" to another element, it can be directly or indirectly connected to the other element, wherein the indirect connection includes "connection via a wireless communication network."

Also, when a part "includes" or "comprises" an element, unless there is a particular description contrary thereto, the part may further include other elements, not excluding the other elements.

Throughout the specification, when one member is positioned "on" another member, this includes not only the case where one member abuts another member, but also the case where another member exists between the two members.

The terms first, second, etc. are used to distinguish one component from another component, and the component is not limited by the terms described above.

An expression used in the singular form encompasses the expression of the plural form, unless it has a clearly different meaning in the context.

The reference numerals used in operations are used for descriptive convenience and are not intended to describe the order of operations and the operations may be performed in an order different unless otherwise stated.

Hereinafter, embodiments of the present disclosure will be described with reference to the accompanying drawings.

Figure 2:
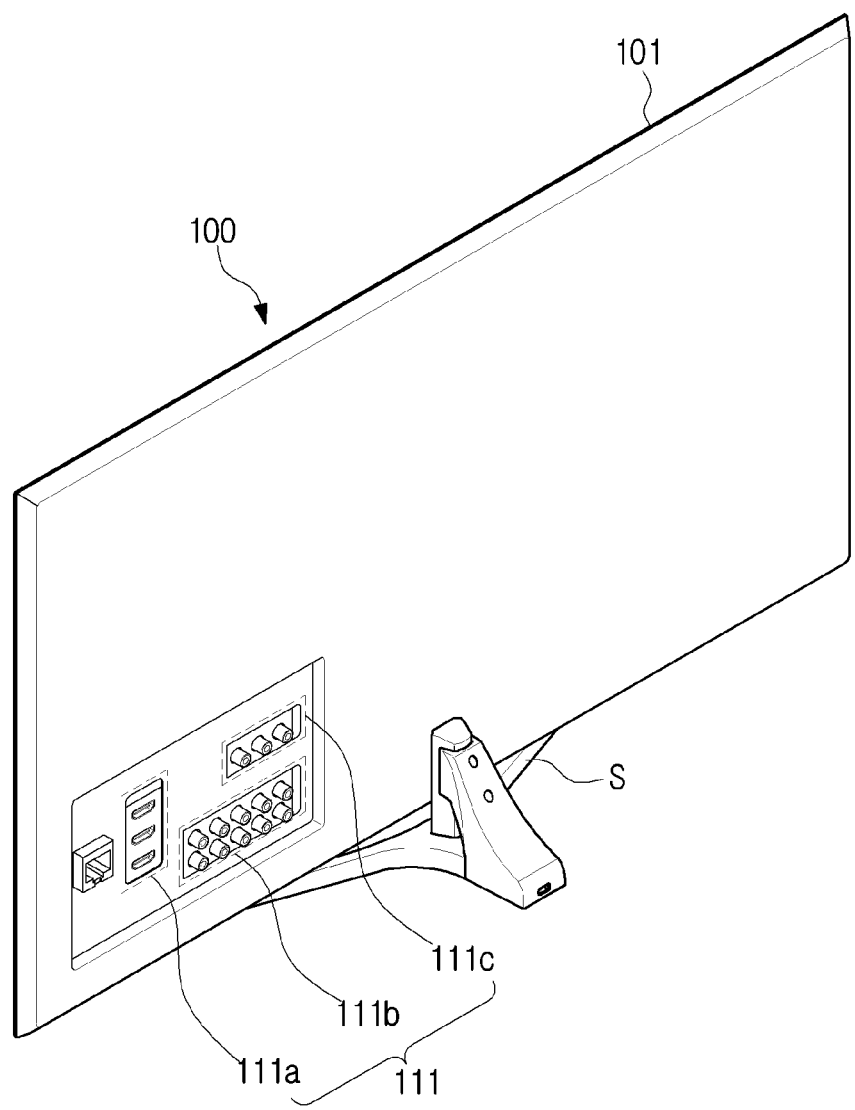
FIG. 2 is a view illustrating an example of an appearance of a display apparatus according to an embodiment from a rear side.

FIG. 1 is a view illustrating an appearance of a display apparatus according to an embodiment of the present disclosure, and FIG. 2 is a view illustrating an example of an appearance of a display apparatus according to an embodiment from a rear side.

A display apparatus 100 is a device capable of processing an image signal received from the outside and visually displaying the processed image. In the embodiment described below, the case where the display apparatus 100 is a television (Television, TV) will be described as an example, but the type of the display apparatus 100 according to an embodiment is not limited thereto. For example, the display apparatus 100 may be a device that visually displays an image by processing the image such as a mobile electronic device such as a PDA, a smartphone, or a laptop computer, or a computer, and the type of the device is not limited.

The display apparatus 100 may receive video signals and audio signals from various content sources, and output video and audio corresponding to the received video signals and audio signals. For example, the display apparatus 100 may receive television broadcast content through a broadcast receiving antenna, receive content from an external device such as a DVD player, a game console, or a set-top box, or receive content from a content providing server via the Internet.

Referring to the example of FIG. 1, the display apparatus 100 may include a main body 101 that forms an exterior and accommodates or supports various components constituting the display apparatus 100.

A display 140 displaying an image may be disposed on the front of the main body 101, and a main body input 151 for receiving a control command from a user may be formed on at least one area of the front of the main body 101. In the example of FIG. 1, the case where the main body input 151 is formed on the front surface of the main body 101 is exemplified, but it is also possible that the main body input 151 is formed on the lower or rear surface of the main body 101. In this embodiment, the direction in which the image is displayed is defined as the front side and the opposite direction is defined as the rear side.

The display 140 may employ one of various display panels such as a liquid crystal display (LCD) panel, a light emitting diode (LED) panel, an organic light emitting diode (OLED) panel, a field emission display (FED) panel, and a quantum dot light emitting diode (Q-LED) panel.

The main body input 151 may be implemented in the form of a button, in the form of a touch pad, or in the form of a dial or jog-shuttle in which the user pushes or rotates.

In addition, the display apparatus 100 may further include a remote input 152 such as a remote controller so that the user can input a control command even at a distance from the main body 101 in addition to the main body input 151 provided in the main body 101.

Examples of the control commands input from the user include power on/off, sound level adjustment, broadcast channel selection, game mode/broadcast mode selection mode, display screen brightness, saturation, and other display characteristics adjustment.

In addition, although not shown in the drawing, a speaker for outputting audio may be provided in one area of the main body 101. For example, the speaker may be provided on the back of the main body 101.

Meanwhile, in the example of FIG. 1, the case where the main body 101 is supported by a stand S and is disposed on a horizontal surface is illustrated as an example. However, this is only an example of the display apparatus 100. A bracket is connected to the back of the main body 101, and the bracket is installed on the wall, so it is also possible to implement a wall mount.

As described above, the display apparatus 100 may receive image content from various sources. For example, when the display apparatus 100 is connected to an external device by wire and receives video content, as shown in FIG. 2, a connector of a cable connecting an external device and the display apparatus 100 may be inserted into various types of cable ports 111 provided on the rear side of the display apparatus 100.

According to the example of FIG. 2, the cable port 111 may include an HDMI port 111a, a composite port 111b, and a component port 111c. An HDMI cable that transmits both a video signal and an audio signal may be connected to the HDMI port 111a, one video signal cable and two audio signal cables may be connected to the composite port 111b, and three video signal cables and two audio signal cables may be connected to the component port 111c.

The user can connect the external device and the display apparatus 100 using the appropriate cable according to a standard supported by the external device providing video content. However, the cable port 111 shown in FIG. 2 described above is only an example applicable to the display apparatus 100. Therefore, it is also possible that some of the HDMI port 111a, the composite port 111b, and the component port 111c are omitted. Also, when the specifications are completely changed, it is also possible to provide completely different types of ports according to the changed specifications.

Figure 3:
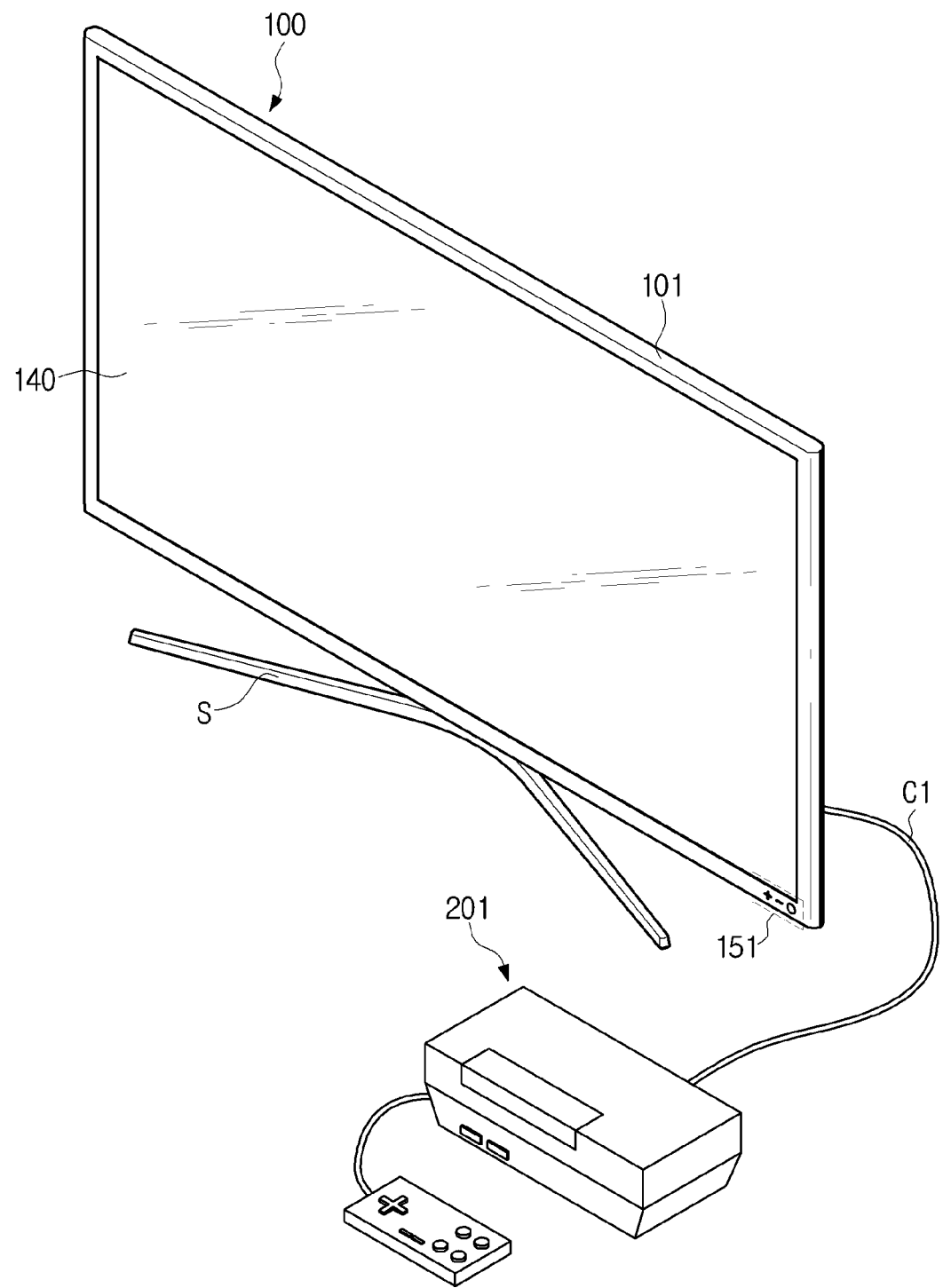
FIG. 3 is a view illustrating a case in which a display apparatus according to an embodiment is connected to a game console.
Figure 4:
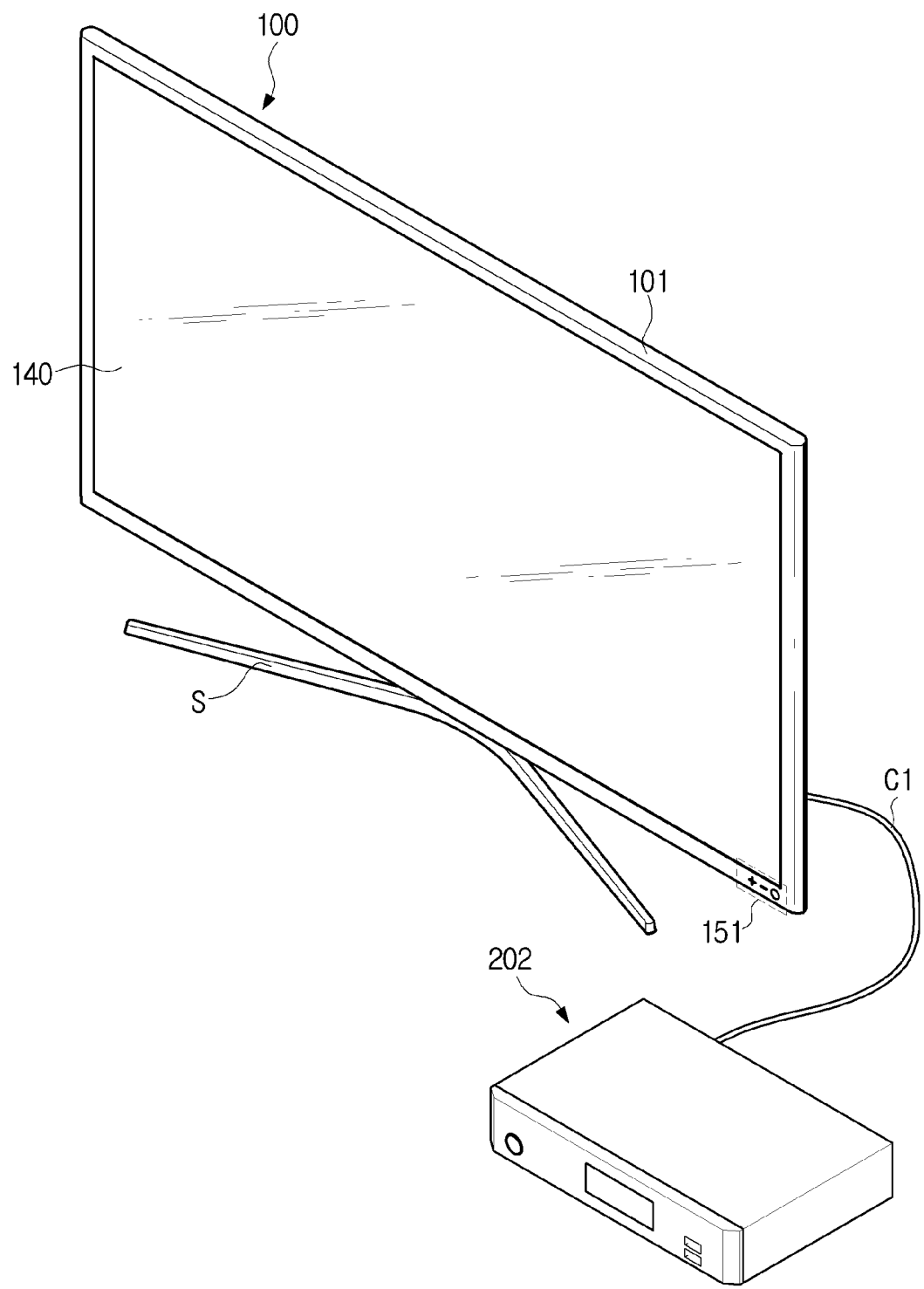
FIG. 4 is a view illustrating a case in which a display apparatus according to an embodiment is connected to a set-top box.

FIG. 3 is a view illustrating a case in which a display apparatus according to an embodiment is connected to a game console. FIG. 4 is a view illustrating a case in which a display apparatus according to an embodiment is connected to a set-top box.

As shown in FIG. 3, a game console 201 may be connected to the display apparatus 100 through an HDMI cable C1. The HDMI cable C1 is connected to the HDMI port 111a of the display apparatus 100 to transmit game content stored in a memory of the game console 201 to the display apparatus 100. Here, the game content is defined as a concept including a video signal and an audio signal related to a game.

Alternatively, as illustrated in the example of FIG. 4, a set-top box 202 may be connected to the display apparatus 100 through the HDMI cable C1. The HDMI cable C1 is connected to the HDMI port 111a of the display apparatus 100 to transmit broadcast content received by the set-top box 202 to the display apparatus 100. The broadcast content may also include video signals and audio signals.

As another example, an external device connected to the display apparatus 100 may also include a content playback device such as a video player, a DVD player, or a Blu-ray player. Even in this case, the display apparatus 100 and the external device can be connected using an appropriate cable according to a standard supported by the external device.

Also, it is possible to receive compressed video of the display apparatus 100 in real time through wireless communication. In a wireless transmission environment, in order to transmit video data, the video data may be compressed according to a certain compression standard and transmitted to the display apparatus 100 in the form of a bit stream. Bitstream-type video transmission is called streaming.

Figure 5:
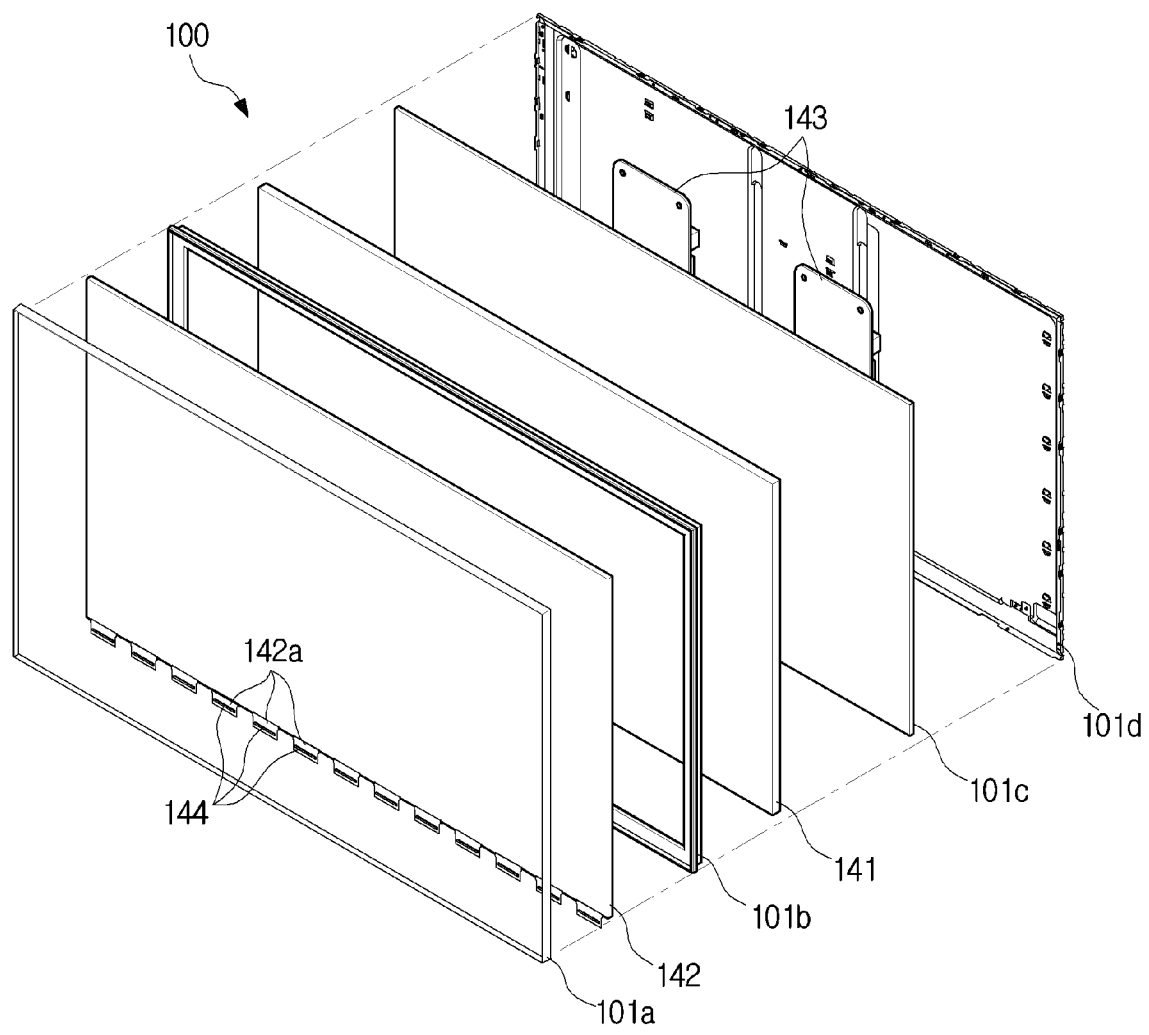
FIG. 5 is an exploded perspective view of a display apparatus according to an embodiment.

FIG. 5 is an exploded perspective view of a display apparatus according to an embodiment.

As illustrated in FIG. 5, various component parts for generating an image may be provided inside the main body 101.

For example, the main body 101 may include a backlight unit 141 that emits surface light forward, a liquid crystal panel 142 that blocks or transmits the light emitted from the backlight unit 141, and a power/control unit 143 for controlling the operation of the backlight unit 141 and the liquid crystal panel 142.

In addition, the main body 101 includes a bezel 101a for supporting and fixing the liquid crystal panel 142, the backlight unit 141, and the power/control unit 143, and a frame middle mold 101b, a bottom chassis 101c, and a back cover 101d.

The backlight unit 141 may include a point light source that emits monochromatic light or white light, and may refract, reflect, and scatter light to convert the light emitted from the point light source into uniform surface light. For example, the backlight unit 141 includes a light source that emits monochromatic light or white light, a light guide plate through which light is incident and diffuses the incident light from the light source, a reflective sheet that reflects the light emitted from the back of the light guide plate, and an optical sheet that refracts and scatters the light emitted from the front surface of the light guide plate.

The liquid crystal panel 142 is provided in front of the backlight unit 141 and may form an image by blocking or transmitting the light emitted from the backlight unit 141.

The liquid crystal panel 142 may be formed of a plurality of pixels P arranged in a 2D matrix form. The plurality of pixels P included in the liquid crystal panel 142 may independently block or transmit the light of the backlight unit 141, and light emitted from the plurality of pixels P is displayed on the display apparatus 100 to form an image.

The power/control unit 143 may include a power circuit that supplies power to the backlight unit 141 and the liquid crystal panel 142, and a control circuit that controls the operation of the backlight unit 141 and the liquid crystal panel 142.

The power circuit can supply power to the backlight unit 141 so that the backlight unit 141 can emit surface light, and supply power to the liquid crystal panel 142 so that the liquid crystal panel 142 can transmit or block light.

The control circuit may adjust voltage applied to each of the plurality of pixels constituting the liquid crystal panel 142. It is also possible to control the intensity of light emitted by the backlight unit 141.

The power/control unit 143 may be implemented with a printed circuit board and various circuits mounted on the printed circuit board. For example, the power supply circuit may include a capacitor, a coil, a resistance element, a microprocessor, and the like, and a power supply circuit board on which they are mounted. Further, the control circuit may include a memory, a microprocessor, and a control circuit board on which they are mounted.

Between the liquid crystal panel 142 and the power/control unit 143, a cable 142a for transmitting image data from the power/control unit 143 to the liquid crystal panel 142 and a display driver integrated circuit (DDI) 144 for processing the image data (hereinafter referred to as 'display drive unit') are provided.

The cable 142a may electrically connect the power/control unit 143 and the display drive unit 144, and electrically connect the display drive unit 144 and the liquid crystal panel 142.

The display drive unit 144 may receive image data from the power/control unit 143 through the cable 142a and transmit the image data to the liquid crystal panel 142 through the cable 142a.

Figure 6:
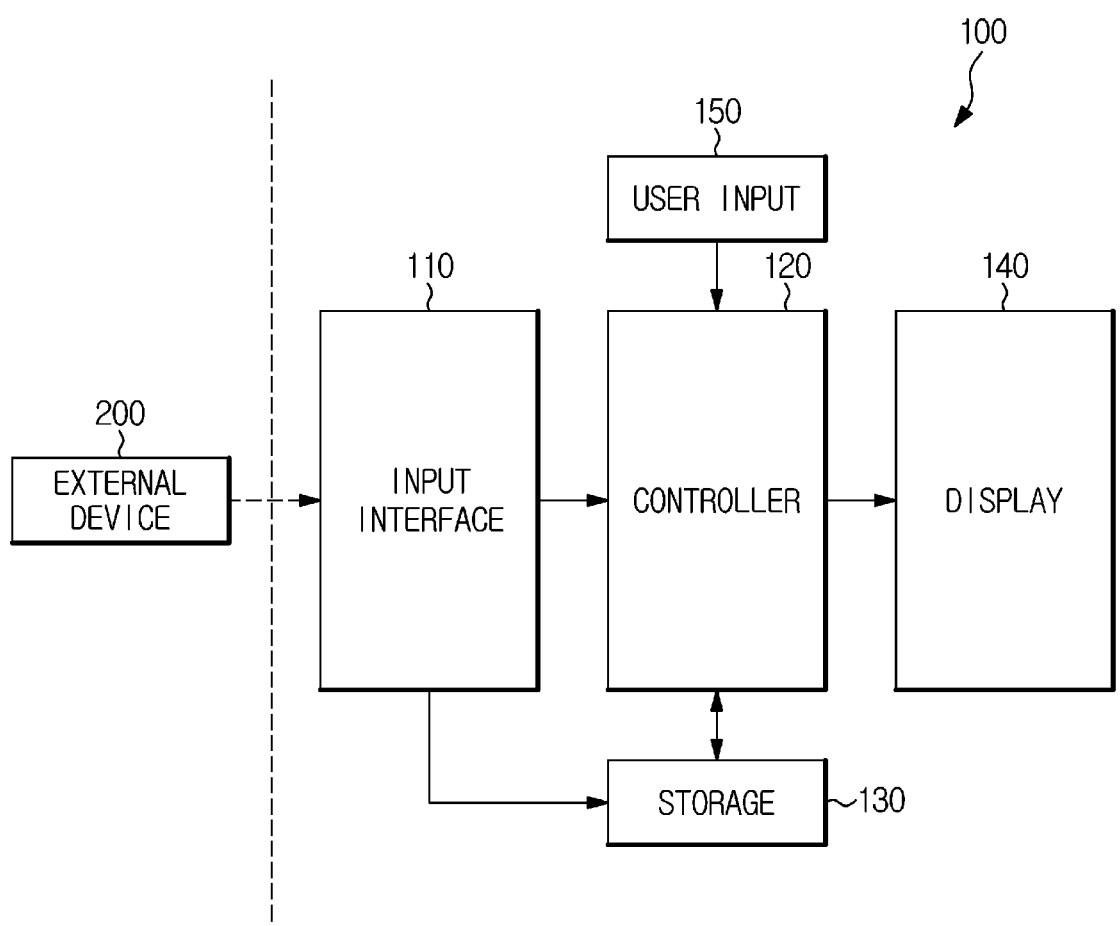
FIG. 6 is a control block diagram of a display apparatus according to an embodiment.

FIG. 6 is a control block diagram of a display apparatus according to an embodiment.

Referring to FIG. 6, the display apparatus 100 according to an embodiment includes an input interface 110 for receiving a content signal from an external device 200, a controller 120 for analyzing a video signal included in an input content signal to determine characteristics of the input content signal, and adaptively adjusting image processing parameters for the input content signal based on the determined characteristics, a storage 130 for storing data necessary to perform image processing on the input content signal, the display 140 for displaying the content signal on which image processing has been performed, and a user input 150 for receiving a user input.

The external device 200 that provides the content signal to the display apparatus 100 may be the game console 201, the set-top box 202, the video player, the DVD player, the Blu-ray player, the mobile device such as the computer, the smartphone, storage such as USB However, as mentioned above, the display apparatus 100 does not necessarily need to receive the content signal from the external device 200, and it is of course possible to receive the content signal from an external server through wireless communication. In this case, the display apparatus 100 may further include a wireless communication module.

The input interface 110 may include the cable port 111 for connection with the external device 200 as described above. The cable port 111 may include at least one type of port according to a transmission standard of a video signal and an audio signal. The user may connect the external device 200 and the display apparatus 100 by using a cable conforming to a standard applied to the external device 200 that provides a content signal.

Also, the input interface 110 may include a USB terminal.

Also, the input interface 110 may include a decoder that decodes compressed video. For example, when the display apparatus 100 receives a compressed video in the form of a bitstream, the decoder may decompress the video by performing decoding in a process opposite to that of the video.

As described above, the content signal may include a video signal and an audio signal. In the embodiments described below, the video signal included in the input content signal is referred to as an input image. The input interface 110 may transmit the input image composed of a plurality of frames to the controller 120.

The controller 120 may determine characteristics of the input image, and adjust image processing parameters based on the determined characteristics of the input image.

For example, the controller 120 may perform frame rate conversion (FRC) to improve motion blur of an input image. Frame rate conversion is an image processing technique in which at least one intermediate frame is generated and inserted between frames of an input image, and motion blur can be improved without deteriorating luminance.

In order to perform frame rate conversion, other frames temporally adjacent to the processing target frame are used as reference data. At this time, as the number of frames referred to increases, the effect of improving motion blur increases and a high-quality video can be displayed, while a frame delay increases. In this embodiment, the image processing parameter includes the number of frames used for frame rate conversion.

Accordingly, the controller 120 may apply a different number of frames used for frame rate conversion according to the content type of an input image. For example, the controller 120 may increase the number of reference frames when there is a great need to improve motion blur even if a frame delay occurs. When a reduction in image processing time is required more than the need for motion blur improvement, the controller 120 may reduce the number of reference frames or may not perform frame rate conversion in some cases. The detailed operation of the controller 120 will be described in more detail later.

The controller 120 may include at least one memory in which programs for performing the above-described operations and the operations described below are stored, and at least one processor for executing the stored programs. The at least one memory and the at least one processor may be integrated on a single chip, or may be physically separated.

In addition, it is also possible for the controller 120 to perform an overall operation for controlling the display apparatus 100 in addition to adjusting the image processing parameters according to the characteristics of an input image.

The storage 130 may temporarily or non-temporarily store the video signal and audio signal included in the input content signal. The storage 130 may temporarily or non-temporarily store data necessary for image processing of an input image. The types of data stored in the storage 130 will be described in detail later.

The storage 130 may include at least one of a volatile memory and a non-volatile memory. In addition, the storage 130 is not necessarily physically separated from the controller 120, and it is possible that they are integrated on a single chip or share memory.

The display 140 may display a video signal on which the image processing is performed by the controller 120 as an image. The description of the configuration of the display 140 is as described above.

The user input 150 may include the main body input 151 and the remote input 152 described above to receive the user input.

Figure 7:
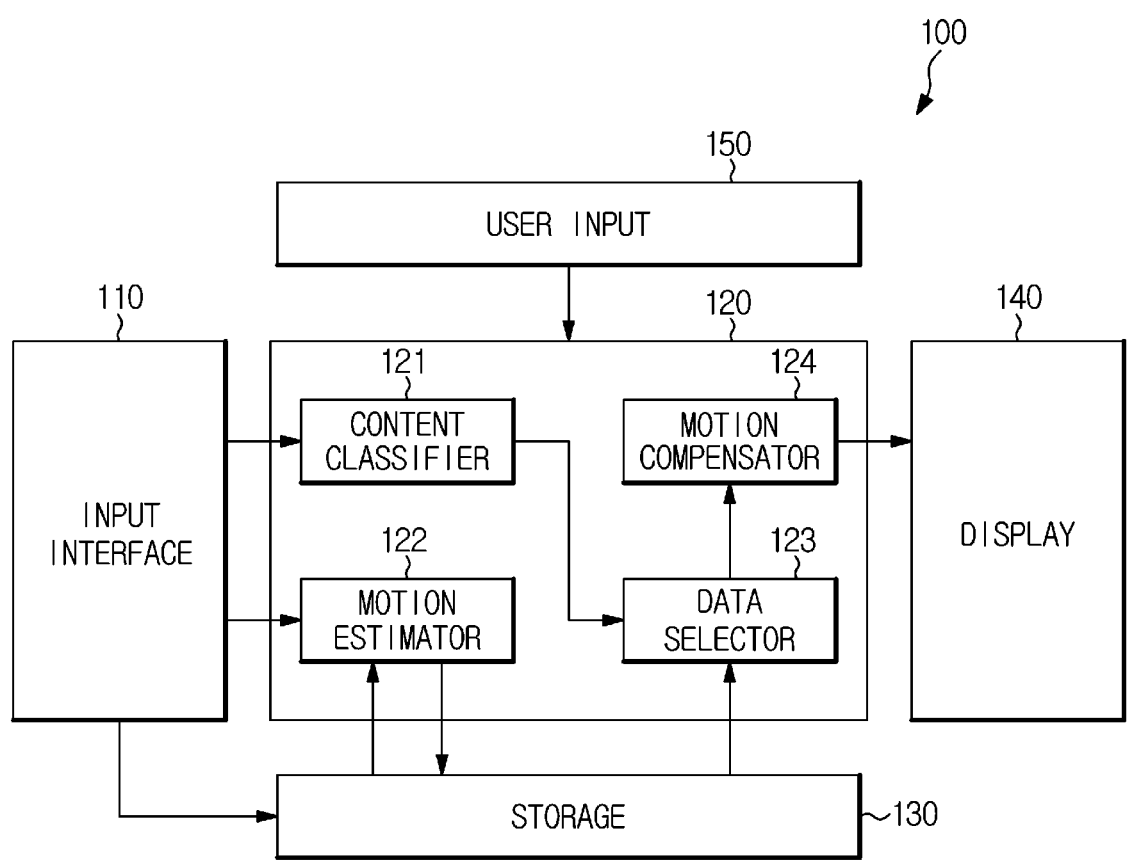
FIG. 7 is a control block diagram embodying a controller of a display apparatus according to an embodiment.

FIG. 7 is a control block diagram embodying a controller of a display apparatus according to an embodiment.

Referring to FIG. 7, the controller 120 includes a content classifier 121 for determining a content type based on the characteristics of an input image, a motion estimator 122 for estimating the motion of the input image, a parameter setting unit 123 for setting image processing parameters related to an image processing time according to the content type, and a motion compensator 124 for performing motion compensation on the input image based on the motion estimation result and the set image processing parameters.

The content classifier 121, the motion estimator 122, the parameter setting unit 123, and the motion compensator 124 shown in FIG. 7 are classified according to operations performed by the controller 120, and do not necessarily need to be implemented as separate processors. Depending on the performance of the processor, a single processor can perform all the operations of the content classifier 121, motion estimator 122, the parameter setting unit 123, and the motion compensator 124. Of course, it is also possible to use more than one processor.

The content classifier 121 may determine characteristics of an input image and determine the type of content of the input image based on the characteristics of the input image. For example, the type of content may include game content and general video content. Here, the general video content means video content excluding games.

Specifically, when the game console 201 is connected to the display apparatus 100, a game flag can be transmitted from the game console 201. The game flag may include a value that distinguishes a game mode from a video mode. For example, when the value of the transmitted game flag is 1, it can be defined as the game mode, and when the value of the transmitted game flag is 0, it can be defined as the video mode. Accordingly, if the game flag transmitted from the game console 201 is 1, the content classifier 121 may determine the content of the input image as a game, and if the transmitted game flag is 0, it is possible to determine the content of the input image as a normal video.

The type of the general video content may include at least one of a sports broadcast, a movie, and a general broadcast. Here, the general broadcast may mean video content excluding sports broadcasts and movies among the general video content. For example, content that implements content such as dramas, news, and entertainment programs may be referred to as the general video content.

When the content of an input video is a general video, the content classifier 121 may determine whether or not the content of the input video is a movie by using the characteristics of the input video when the video is a movie. For example, when a film cadence is detected in the input image, it may be determined that the content of the input image is a movie. The film cadence is to adjust the frame rate applied when shooting a movie according to the playback conditions of the TV, and may also be referred to as a telecine cadence. For example, an image captured at 24 frames per second (24 fps) may be stored at 30 frames per second (30 fps). Cadence in this case may be referred to as 3:2 Cadence Pulldown.

When the film cadence is not detected, the content classifier 121 may determine whether the content of the input image is a sports broadcast using at least one of color, depth, motion, and voice of the input image.

For example, when the color of the input image indicates green or blue characteristics, the content of the input image may be determined as a sports broadcast such as soccer, baseball, or golf. Specifically, the content classifier 121 may determine the content of the input image as a sports broadcast when the reference region of the frame constituting the input image represents a green or blue color. At this time, when a frame having a reference number or more among the plurality of frames constituting the input image exhibits the above-described color characteristics, the content of the input image may be determined as a sports broadcast.

In addition, the content classifier 121 may analyze the depth of the input image to determine that the content of the input image is a soccer or baseball broadcast, or analyze the motion of the input image to determine whether panning used in the soccer broadcast appears.

In addition, the content classifier 121 may analyze an audio signal and determine that the content of the input video is a sports broadcast when spectator noise is detected.

In addition, it is also possible for the content classifier 121 to determine the content of the input image using metadata such as an EPG (Electronic Program Guide). In the embodiment of the disclosed invention, the content classifier 121 does not limit the method for determining the content of the input image. In addition to the above-described methods, various methods of classifying content may be applied to embodiments of the display apparatus 100.

On the other hand, when the content of the input image is game content, the content classifier 121 can also determine the genre of the input game content. Hereinafter, the operation of determining the game genre will be described in detail.

For example, the game genre may include at least one of FPS (First-person shooter), Racing, Role Playing Game (RPG), Real-Time Strategy (RTS), and Aeon of Strife (AOS).

For example, FPS (First-person shooter) is a kind of shooting game where you do battle with weapons or tools on the same screen as a player's point of view. The game video of the FPS genre can be produced in a 3D graphic manner mainly from the player's point of view.

Racing is a game of racing on the same screen as the player's point of view. The game video of the Racing genre can also be produced in a 3D graphic manner mainly from the player's point of view.

RPG (Role Playing Game) is a kind of role-playing game in which the player plays as characters in the game and develops a story.

RTS (Real-Time Strategy) is a kind of strategy game played in real time, and AOS (Aeon of Strife) is a kind of game that combines the characteristics of RTS and RPG.

The content classifier 121 may determine the genre of the game based on the difference in the characteristics of images provided for each game genre. Specifically, the content classifier 121 detects feature information including at least one of motion and depth of an input image.

The content classifier 121 may predict the motion degree and size of an object included in the input image based on a plurality of the input images continuously input, and detect the feature information of the images based on the predicted motion information.

The content classifier 121 can analyze the overall motion and the local motion of the input images, and more specifically, the direction and speed of the overall motion and the local motion.

The content classifier 121 detects the depth of the input image based on a depth cue including at least one of geometric information, luminance information, frequency information, and histogram distribution information of the input image, and detects the feature information of an image including at least one of a vanishing point, a horizontal line, and a composition of an object.

Figure 8:
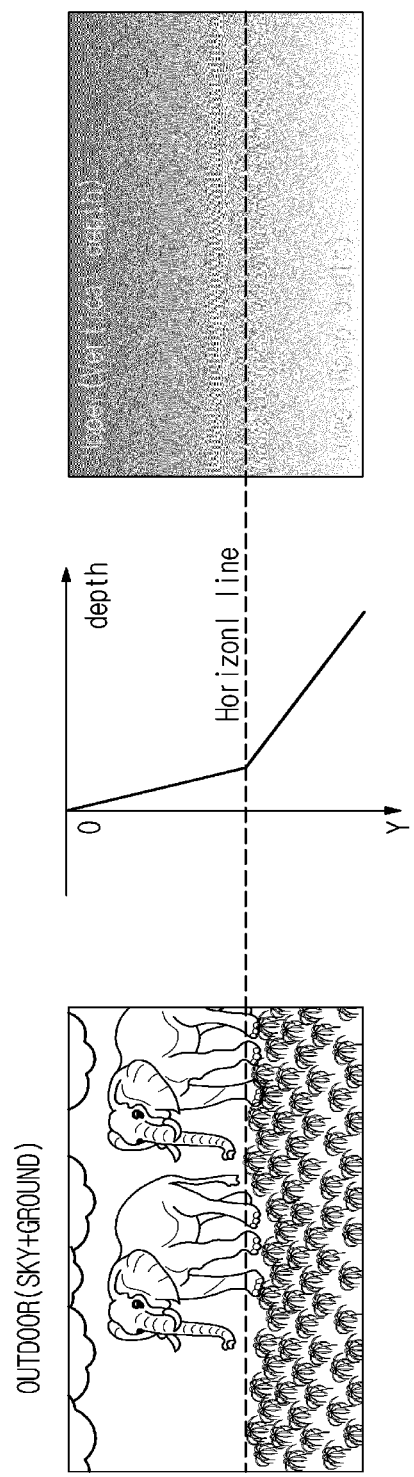
FIGS. 8 and 9 are views illustrating an example of using luminance information and geometric information of an input image as depth cues.
Figure 9:
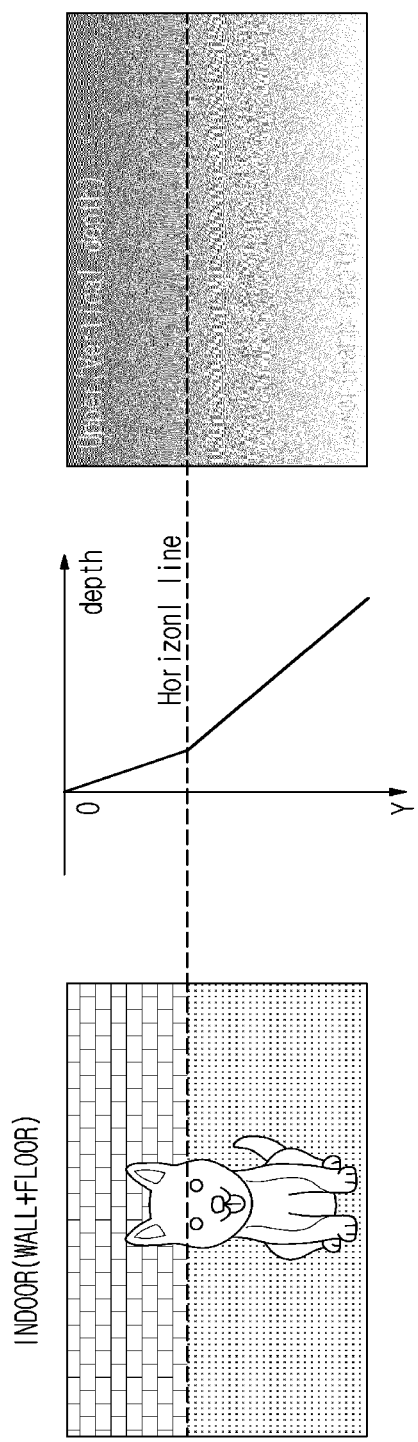

FIGS. 8 and 9 are views illustrating an example of using luminance information and geometric information of an input image as depth cues.

Referring to FIGS. 8 and 9, the content classifier 121 may distinguish indoor and outdoor of an input image by using luminance information of the input image as a depth cue. However, the method of distinguishing the indoor and the outdoor of the input image is not limited thereto, and according to an embodiment, a first color (for example, blue) preset on the top of a horizontal line using histogram information and geometric information about the color of the input image Series of colors) are mainly distributed, if the second color (for example, green or black-based color) preset at the bottom of the horizontal line is mainly distributed, the space provided for the input image is outdoor, and if the above conditions are not satisfied, the space provided for the input image can be divided into indoors.

Subsequently, the content classifier 121 may detect a horizontal line portion of the input image using geometric information as a depth cue, and determine the horizontal portion as a remote view. According to an embodiment, when the input image includes a vanishing point, the vanishing point part may be detected and the corresponding part may be determined as a remote view.

Figure 10:
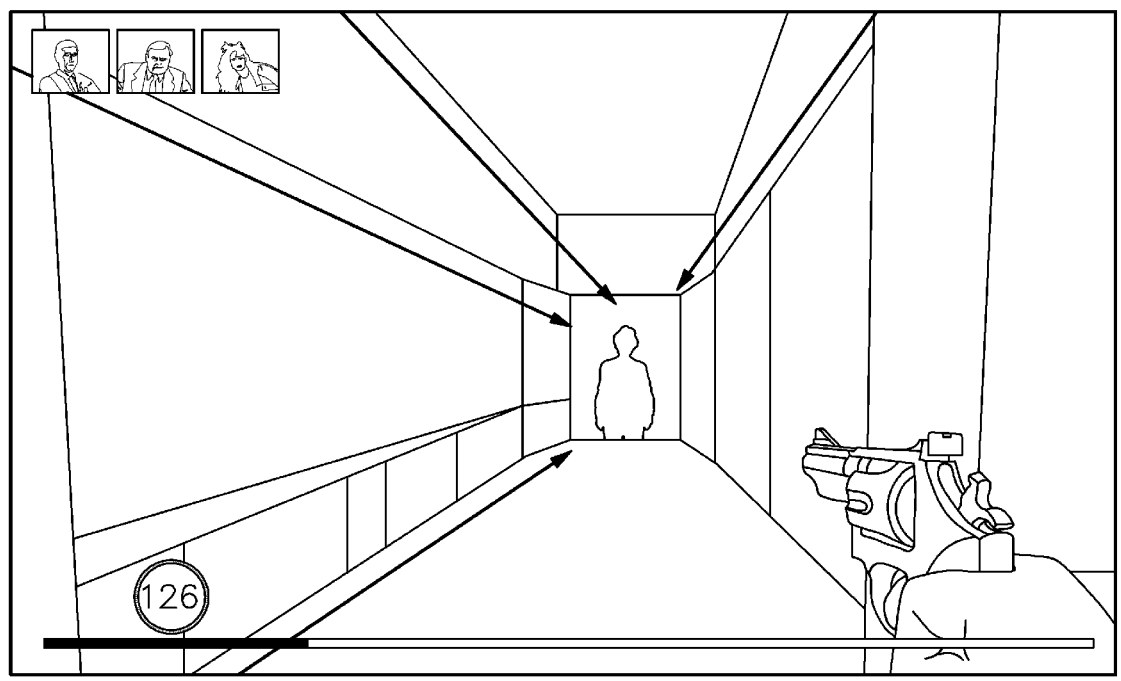
FIGS. 10 and 11 are views illustrating other examples of using geometric information of an input image as a depth cue.
Figure 11:
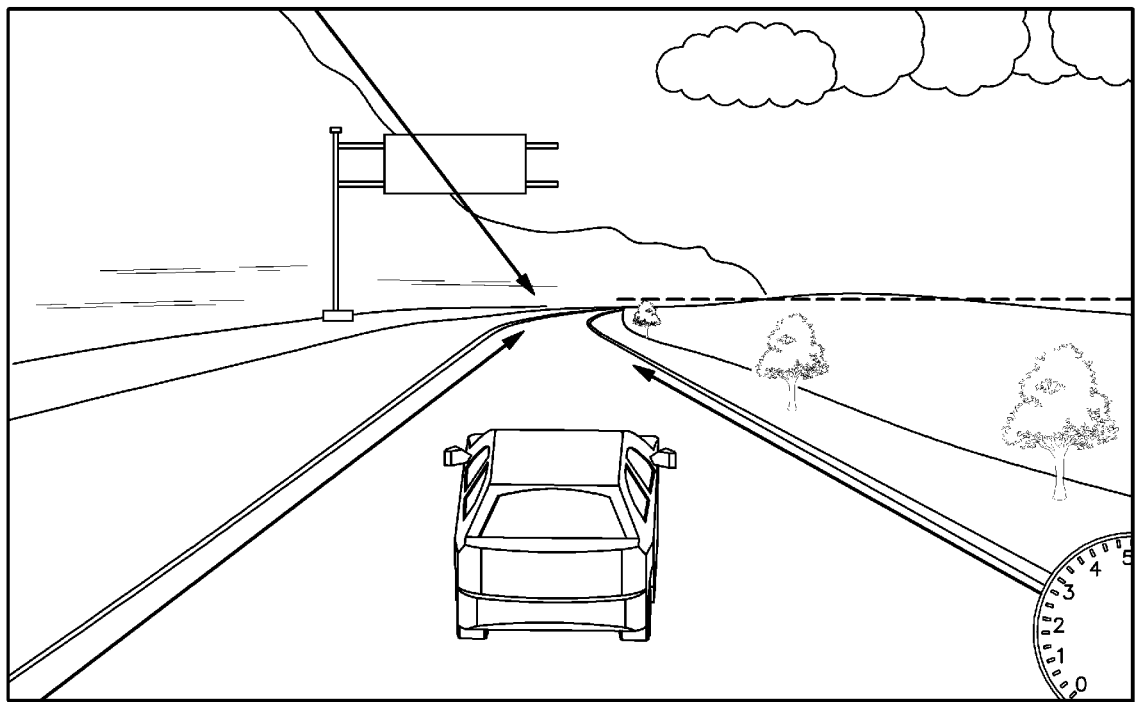

FIGS. 10 and 11 are views illustrating other examples of using geometric information of an input image as a depth cue.

Referring to FIG. 10, the content classifier 121 can detect a vanishing point of an input image and determine a vanishing point part as a remote view using geometric information of the input image as a depth cue.

Referring to FIG. 11, the content classifier 121 can detect the vanishing point and the horizontal line of the input image using the geometric information as a depth cue, and determine the vanishing point and a horizontal line part as a distal view. In FIG. 11, a leader line for deriving a vanishing point is shown as a solid line, and a horizontal line is shown as a dotted line to distinguish it from the leader line for deriving the vanishing point.

When the content classifier 121 uses the luminance information of the input image as a depth cue, the content classifier 121 may determine as a near view when the main luminance is distributed in the center portion of the input image and the lower portion of the center. In more detail, the content classifier 121 distinguishes the luminance of background and foreground objects through analysis of global luminance distribution of the input image, and assigns a high depth to the gray scale of a minority distribution through analysis of a luminance distribution in a local area unit.

When the frequency information of the input image is used as a depth cue in the content classifier 121, and when the image frequency is a high frequency higher than or equal to a preset first frequency, a depth detector 146 determines as the near view because the corresponding part is in focus. Also, when the image frequency is a low frequency below a preset first frequency, the depth detector 146 determines as a distal view because the corresponding part is not focused.

When using the histogram distribution information of the input image in the content classifier 121 as a depth cue, the content classifier 121 may detect the feature information of an image based on histogram information on color, motion, and the like of the input image.

For example, the content classifier 121 uses the histogram distribution information of the motion of the input image to determine the object as a near view when the motion of the object included in the input images is greater than or equal to a first preset speed, and determine the object as a distal view when the motion of the object included in the input images is less than the first preset speed.

The content classifier 121 can determine the game genre for the input image on the basis of the feature information of the image including at least one of the vanishing point, the horizontal line and the composition of the object, and the feature information of the image including the direction and velocity information of the overall motion and the regional motion of the input image.

Hereinafter, a method of determining the game genre for the input images based on the type of the feature information of the image considered for each game genre and the corresponding feature information in order to determine the game genre for the input image in the content classifier 121 will be described.

However, the contents described below are only examples of a method of determining the game genre in the content classifier 121, and the embodiment of the display apparatus 100 is not limited to the examples described below. In other words, when determining the game genre in the content classifier 121, the feature information of the image to be considered may be added or omitted in a manner such as upgrading software according to a designer's intention.

In order to determine the game genre of the input image in the content classifier 121, the feature information of the image considered for each game genre is as follows.

In the FPS and Racing game genres, a vanishing point exists as illustrated in FIG. 9, and a foreground object is present in a lower portion based on a center region of the input image. Also, in the FPS game genre, there are many quick panning operations, and in the Racing game genre, the panning movements have slight depth instead of slight movements, and the movements of the vanishing point tend to be smooth.

The RPG game genre tends to have a fast transition of images and does not maintain a constant pattern, and the RTS game genre does not have a large difference in depth across input images and tends to frequently detect panning motions. In addition, the AOS game genre is a combination of the RPG game genre and the RTS game genre's video features.

The content classifier 121 may determine the game genre of an input image in consideration of the above characteristics.

For example, the content classifier 121 may determine the genre as the FPS game genre when a vanishing point exists in an input image, a foreground object exists in a lower portion based on the center region of the input image, and a fast panning operation is detected.

Also, the content classifier 121 determines the genre as the Racing game genre when there is a vanishing point in an input image, a foreground object is present in the lower part based on the center region of the input image, the panning operation is insignificant instead of having a certain depth, and the movement of the vanishing point is detected to have a smooth tendency.

In addition, the content classifier 121 may determine the genre as the RPG game genre if the transition to video features of an input image is fast and does not maintain a constant pattern.

In addition, the content classifier 121 may determine the genre as the RTS game genre when an input image does not have a large difference in depth as a whole and panning motion tends to be frequently detected.

Also, the content classifier 121 may determine the genre as the AOS game genre when an input image has a fast transition to image characteristics, and the input image does not have a large difference in depth as a whole and panning motion tends to be frequently detected.

In addition, the content classifier 121 may consider the following factors in the process of determining the game genre for an input image.

The content classifier 121 may determine a corresponding game genre as a game genre for input images if characteristics of each genre for the input image satisfies a preset time or number of times.

For example, the content classifier 121 determines the game genre for an input image as a specific game genre when the characteristics of the image determined for a plurality of continuously input frame images correspond to the characteristics of a specific game genre for a preset time, or the characteristics of a predetermined number of frame images among the consecutively input multiple frame images correspond to the characteristics of a specific game genre.

The above-described content is only an example in which the content classifier 121 determines the content type of an input image, and of course, it is also possible to determine the content type of the input image in a manner other than the above-described example. For example, the content classifier 121 can also determine the content type based on metadata of an input image.

Referring back to FIG. 7, the motion estimator 122 and the motion compensator 124 may perform image processing according to a frame rate conversion algorithm to improve a motion blur phenomenon appearing in an input image and implement a high quality image.

Figure 12:
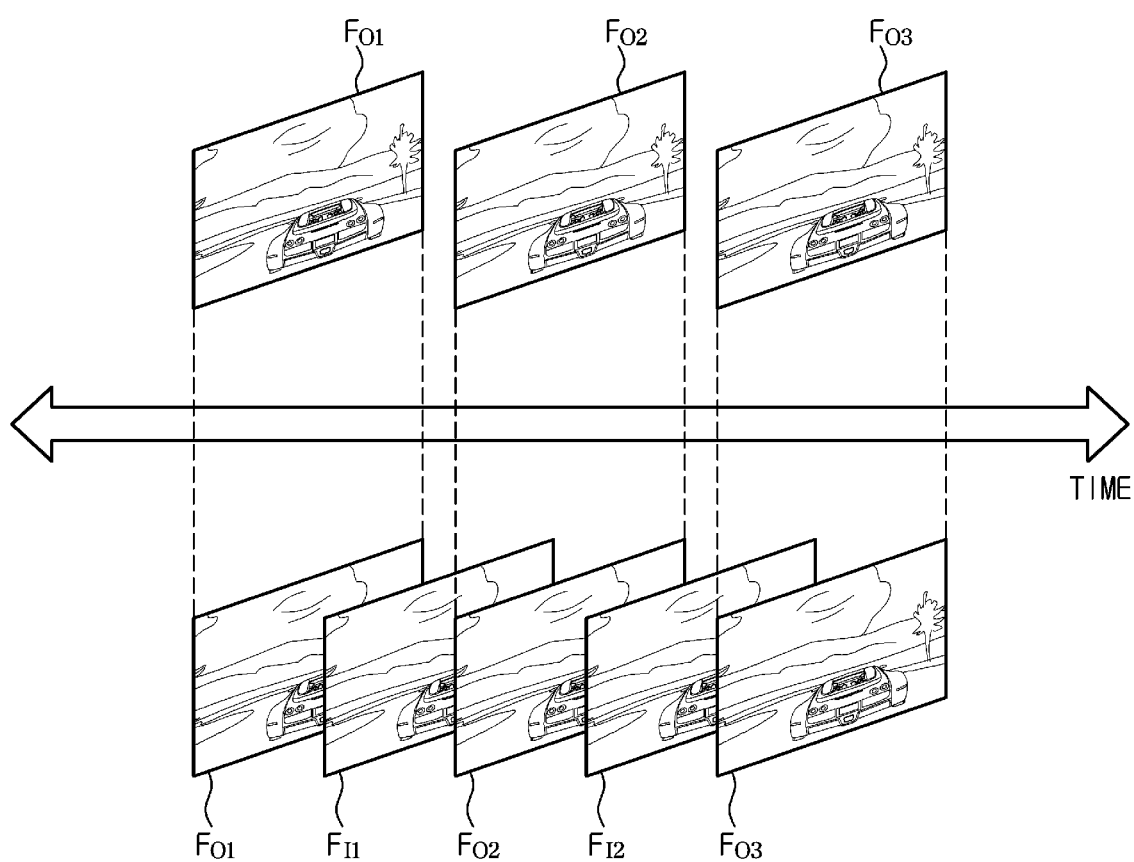
FIG. 12 is a view for explaining a case where a frame rate is increased according to a frame rate conversion algorithm.

FIG. 12 is a view for explaining a case where a frame rate is increased according to a frame rate conversion algorithm.

The motion estimator 122 calculates a motion vector representing a motion change of an object between frame images, and the motion compensator 124 may generate at least one interpolation frame image to be interpolated between original frame images using the motion vector.

As shown in the example of FIG. 12, when the original input image includes a first original frame image $F_{O1}$, a second original frame image $F_{O2}$, and a third original frame image $F_{O3}$, the motion estimator 122 calculates a motion vector of an object appearing between the second original frame image $F_{O2}$ and the first original frame image $F_{O1}$, and generates an interpolation frame image FI1 to be inserted between the second original frame image $F_{O2}$ and the first original frame image $F_{O1}$ based on the calculated motion vector.

In addition, the motion estimator 122 calculates a motion vector of an object appearing between the third original frame image $F_{O3}$ and the second original frame image $F_{O2}$, and generates an interpolation frame FI2 to be inserted between the third original frame image $F_{O3}$ and the second original frame image $F_{O2}$ based on the calculated motion vector.

For example, the motion estimator 122 calculates the motion vectors by analyzing the luminance components of a t frame (current frame, t is an integer of 1 or more) of the original input image and a t-1th frame (previous frame) of the original input image using Phase Correlation Bilateral Motion Estimation (PCB-ME).

The manner in which the motion estimator 122 calculates a motion vector is not limited to the above example, and motion vectors may be calculated according to various known methods such as a block matching method (BMM) and a phase correlation method (PCM).

The motion compensator 124 generates an interpolation frame to be inserted between a t-th frame and a t-1-th frame by modulating RGB video data of a t-th frame image $F_t$ and a t-1th frame $F_{t-1}$ based on the calculated motion vector.

The storage 130 may temporarily or non-temporarily store the input frame image and the motion vector calculated by the motion estimator 122.

The data selector 123 may select and supply data required for the motion compensator 124 to generate an interpolation frame from data stored in the storage 130. For example, the data selector 123 may supply frame data and motion vectors to the motion compensator 124.

As described above, as the number of reference frames used when generating an interpolation frame to be inserted between original frames increases, a motion blur improvement effect is improved to obtain a high quality image. However, as the number of reference frames increases, the time required for image processing, that is, the image processing time increases, resulting in a frame delay.

The data selector 123 may set image processing parameters related to the image processing time based on the content type of an input image determined by the content classifier 121. Specifically, when the content of an input video is a type sensitive to frame delay, such as a game, it is possible to set an image processing parameter that shortens the video processing time compared to the general video content.

Here, being sensitive to the frame delay may mean a case where the user's satisfaction is greatly reduced when a frame delay occurs, that is, a frame delay has a large effect on the user's satisfaction. For example, when the user plays a game, if a delay occurs in the response of the display device to the user's manipulation, satisfaction with the game may be deteriorated. As another example, when the user watches a sports broadcast, satisfaction may deteriorate when a screen is output later than in real-time due to a frame delay. Therefore, games and sports broadcasts can be viewed as a kind of content sensitive to the frame delay.

In addition, when the content of the input image is a kind sensitive to image quality, an image processing parameter capable of realizing a high image quality may be set even if the image processing time is increased.

Here, being sensitive to image quality may mean a case in which the image quality of an output image has a great influence on the user satisfaction. For example, when the user watches a movie, the image quality of the movie may be a factor influencing the satisfaction. Therefore, a movie can be viewed as a kind of content sensitive to the image quality.

The image processing parameter related to the image processing time may include the number of reference frames to be supplied to the motion compensator 124. Accordingly, when the content of the input image is a kind sensitive to the frame delay, the number of reference frames can be set less, and when the content of the input image is a kind sensitive to the image quality of the image, the number of reference frames can be increased.

For example, the data selector 123 pre-stores image processing parameters matched according to the content type, and applies the image processing parameters corresponding to the content type of the input image determined by the content classifier 121 to the frame rate conversion of the corresponding input image. At this time, the image processing parameter stored in advance may have a fixed value or a predetermined range. When having a certain range, the image processing parameters may be stored as larger than or smaller than a preset reference value.

As a specific example, when the content of the input image is a game, the number of reference frames used for motion compensation may be determined to be less than or equal to a first reference value, and when the content of the input image is not a game, the number of reference frames used for motion compensation may be determined to be greater than or equal to a second reference value. The first reference value shall be equal to or greater than the second reference value.

Specifically, the number of reference frames to be used for motion compensation for each content type is stored in advance, and data from the storage 130 can be obtained and supplied to the motion compensator 124 according to the number of reference frames corresponding to the content type of the input image determined by the content classifier 121.

Alternatively, when the data selector 123 sets the image processing parameters, it is needless to say that factors other than the content type may be considered. However, even in this case, the number of reference frames to be used for motion compensation is increased or decreased according to the content type of the input image.

For example, when the content type of the input video is game content, the video processing time may be shorter than the normal video content. That is, it is possible to set a small number of reference frames used for motion compensation. By shortening the image processing time to minimize the frame delay, it is possible to shorten the response time of the image to the user's manipulation.

In addition, when the content type of the input video is game content, it is also possible to set different video processing parameters according to the game genre. For example, when the game genre is FPS, a parameter having the shortest image processing time may be set, and when the game genre is RPG, a parameter having a long image processing time may be set.

In addition, when the content type of the input video is general video content, the parameter may be set to have a longer image processing time than the game content. That is, it is possible to set a large number of reference frames used for motion compensation. When the user passively views an image, such as a sports broadcast, a movie, and a general broadcast, since the limitation on the image processing time is less than that of a game, it is possible to increase the number of reference frames to realize a high-quality image.

However, even when the content type of the input video is general video content, the image processing parameters may be variably set according to the detailed type. For example, when the input video is a sports broadcast, real-time information delivery is more important than other video content, and thus it may be considered to be sensitive to the frame delay. When the input image is a movie, it is considered that a high-quality image is important and relatively less sensitive to the frame delay.

Accordingly, when the input image is a sports broadcast, a parameter having a relatively short image processing time compared to a movie or broadcast may be set. That is, it is possible to set a small number of reference frames used for motion compensation.

In summary, $N_{FPS} < N_{RTS}$, $N_{Racing}$, $N_{AOS} < N_{RPG} < N_{relay} < N_{movies}$, and $N_{broadcasts}$ can be set in the order of the image processing time. Here, N represents the number of reference frames used for motion compensation, and subscripts indicate the content type of the input image.

However, the relationship between the aforementioned content type and the number of reference frames is only an example applicable to the display apparatus 100, and it goes without saying that the content type of the input image or the number of reference frames accordingly may be different from the above-described example.

Figure 13:
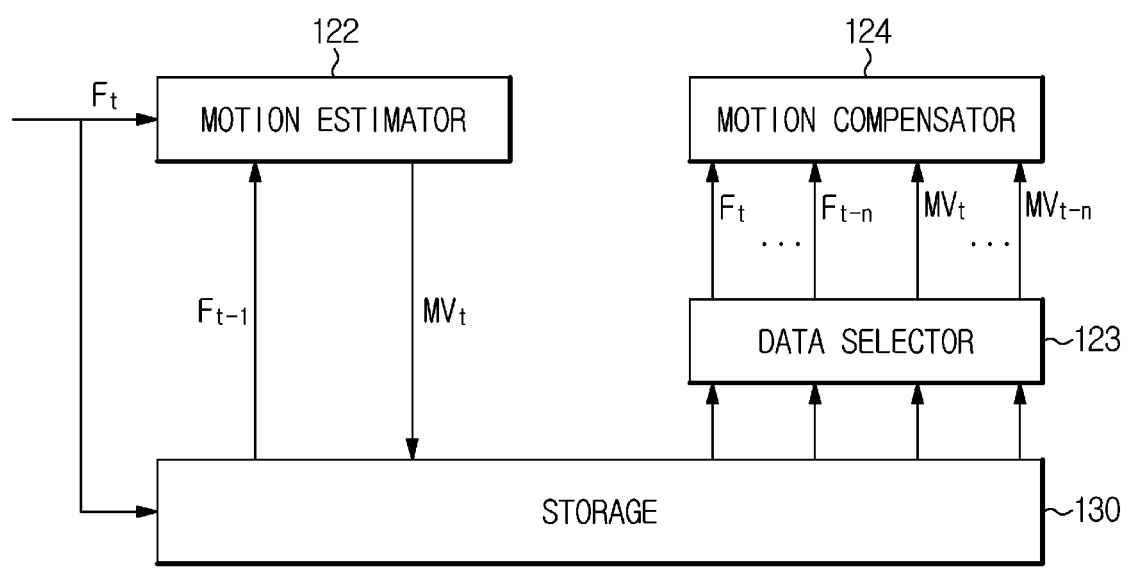
FIG. 13 is a view illustrating data flow in a controller and a storage of a display apparatus according to an embodiment.
Figure 14:
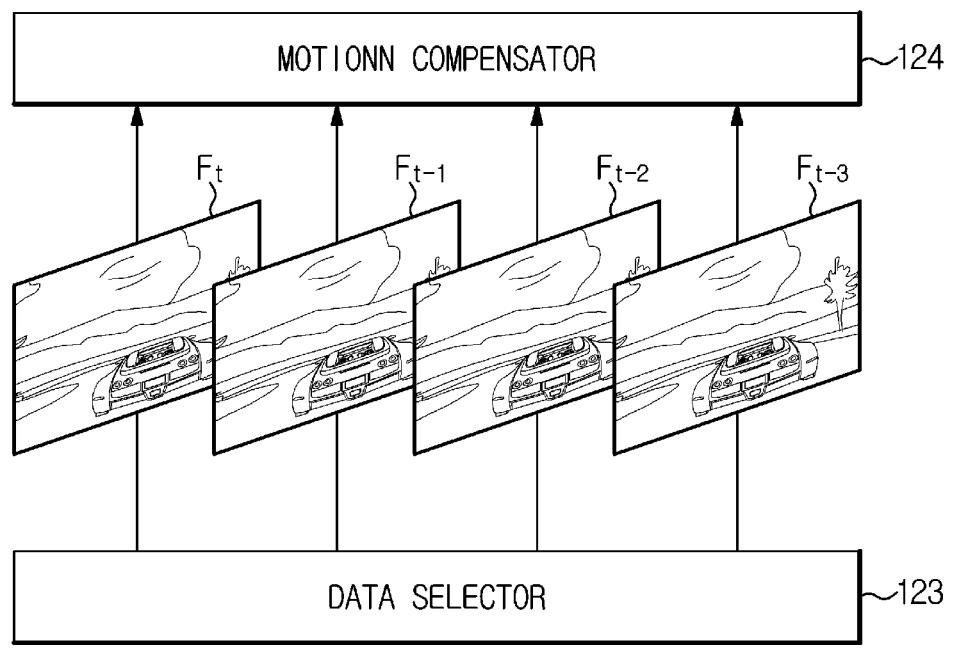
FIGS. 14 and 15 are views showing the number of reference frames that vary depending on a content type of an input image.
Figure 15:
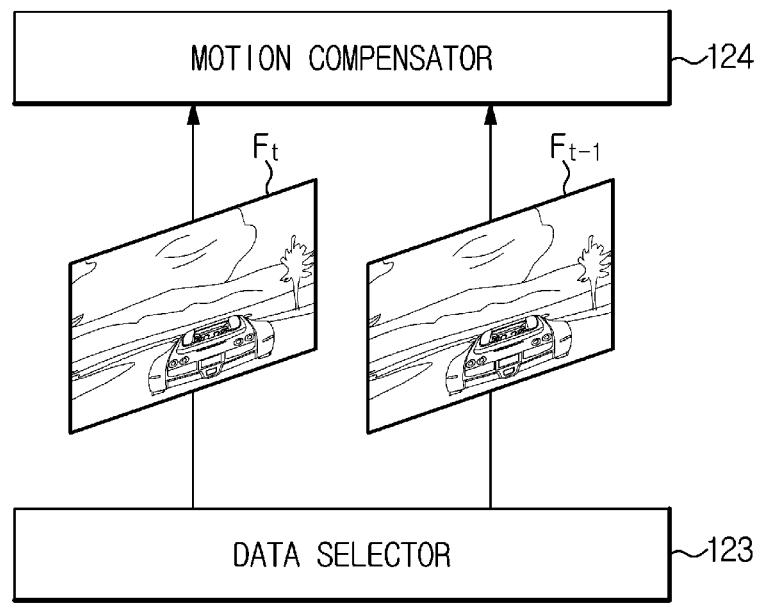

FIG. 13 is a view illustrating data flow in a controller and a storage of a display apparatus according to an embodiment. FIGS. 14 and 15 are views showing the number of reference frames that vary depending on a content type of an input image.

A current frame $F_t$ to be processed is input to the content classifier 121, the motion estimator 122, and the storage 130. The motion estimator 122 takes a previous frame $F_{t-1}$ from the storage 130 and calculates a motion vector $MV_t$ between the current frame $F_t$ and the previous frame $F_{t-1}$. The calculated motion vector $MV_t$ is stored in the storage 130 again.

The content classifier 121 may determine the content type of the input image according to the above-described example, and transmit the determined content type to the data selector 123.

The data selector 123 may determine the number of reference frames to be supplied to the motion compensator 124 according to the content type of the input image. For example, when the data selector 123 determines the number of reference frames to be used for motion compensation of an input image as n (an integer greater than or equal to 0), n frames from the storage 130, that is, the frames from $F_t$ to $F_{t-n}$, that is, a motion vector from $MV_t$ to $MV_{t-n}$ can be taken and supplied to the motion compensator 124.

The motion compensator 124 may generate and insert at least one interpolation frame between the current frame $F_t$ and the previous frame $F_{t-1}$ using the supplied reference frame and motion vector.

For example, when the content type of the input video determined by the content classifier 121 is a movie, the data selector 123 determines the number of reference frames to be used for motion compensation as three (n=3). As shown in the example of FIG. 14, the current frame $F_t$, the t-1 th frame $F_{t-1}$, the t-2 th frame $F_{t-2}$, and the t-3 th frame $F_{t-3}$ may be obtained from the storage 130 and supplied to the motion compensator 124. Although omitted in the drawing, four motion vectors $MV_t$, $MV_{t-1}$, $MV_{t-2}$, and $MV_{t-3}$ are also supplied.

The motion compensator 124 can generate a high quality image using a sufficient reference frame.

Alternatively, when the content type of the input video determined by the content classifier 121 is a Racing game, the data selector 123 determines the number of reference frames to be used for motion compensation as one (n=1). As illustrated in the example of FIG. 15, the current frame $F_t$ and the t-1th frame $F_{t-1}$ may be obtained from the storage 130 and supplied to the motion compensator 124. Two of the motion vectors $MV_t$ and $MV_{t-1}$ are also supplied.

The motion compensator 124 can reduce frame delay by quickly performing image processing using a small number of reference frames.

Figure 16:
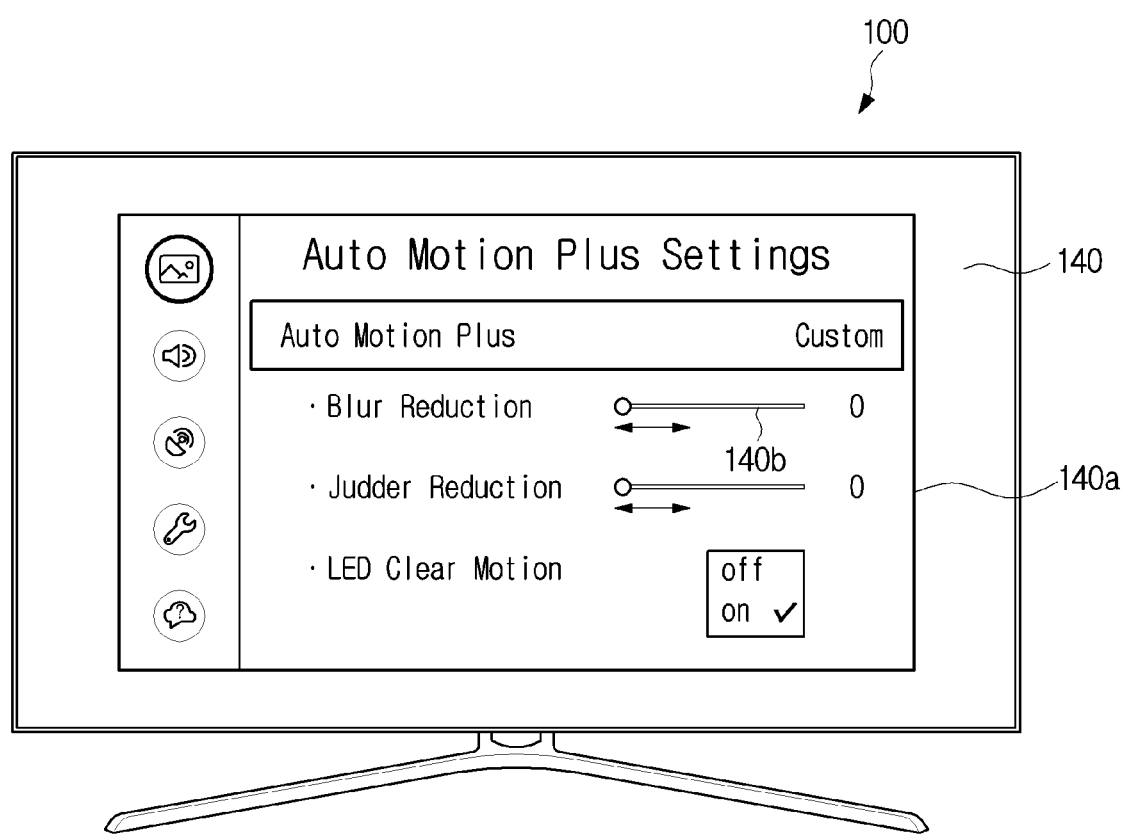
FIGS. 16 to 18 are views illustrating an embodiment in which a user may receive a selection regarding image processing parameters from a user in a display apparatus according to an embodiment.
Figure 17:
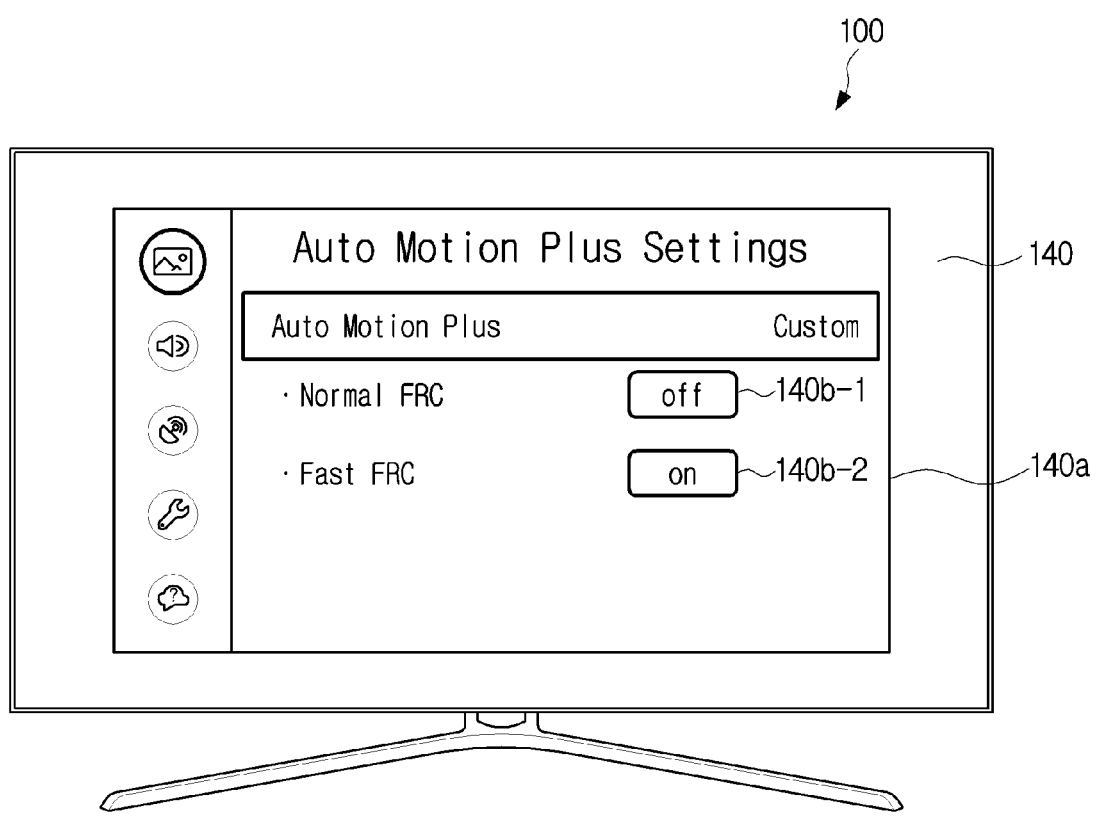
Figure 18:
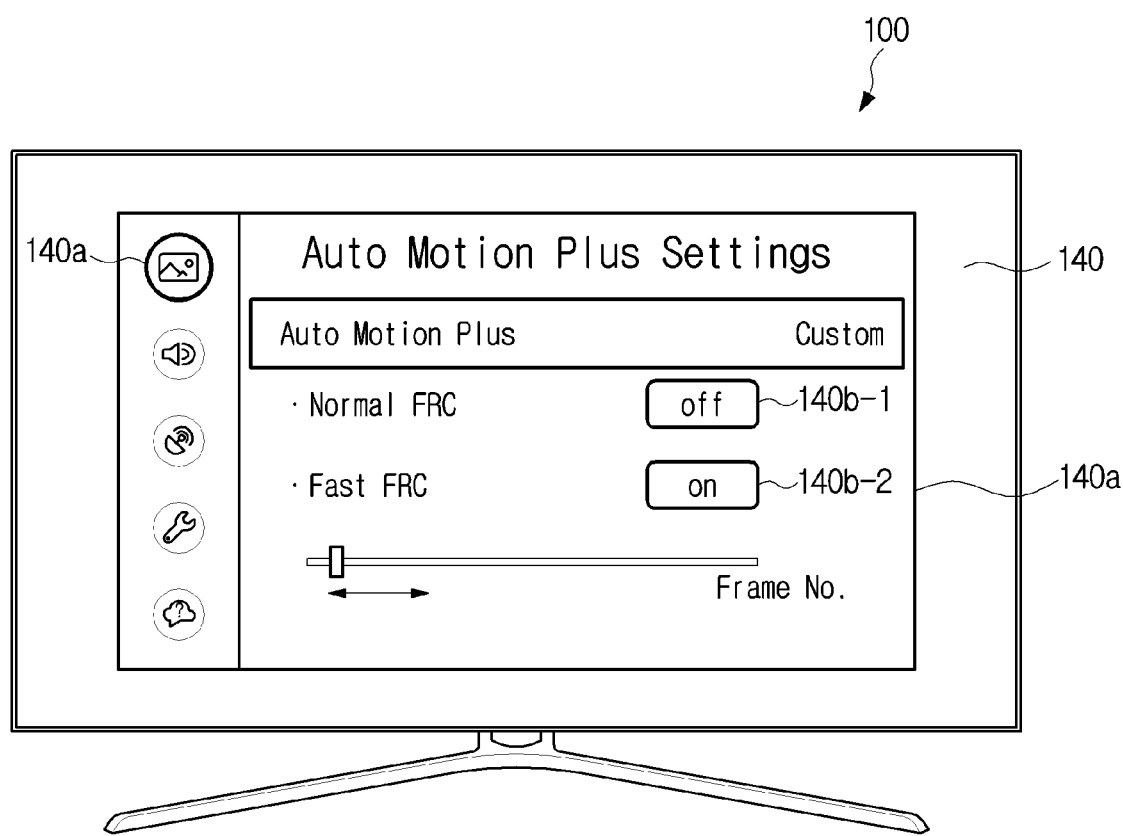

FIGS. 16 to 18 are views illustrating an embodiment in which a user may receive a selection regarding image processing parameters from a user in a display apparatus according to an embodiment.

As shown in FIG. 16, the display 140 may display a setting screen 141 capable of adjusting setting values for motion-related image processing. On the setting screen 141, a blur setting icon 140*b* that can receive a selection of a degree of motion blur improvement may be displayed.

When the blur setting icon 140*b* is implemented in the form of a scroll bar, as shown in the example of FIG. 16, the user may receive a selection for the degree of motion blur improvement by operating the user input 150 to move the scroll bar. For example, the user selects the degree of motion blur improvement less, the controller 120 sets image processing parameters in a direction in which the image processing time is shortened. Also, the degree of motion blur improvement is selected more, the controller 120 may set the image processing parameter in a direction in which the number of reference frames increases even if the image processing time increases.

Alternatively, as illustrated in FIG. 17, the display 140 displays an icon 140*b*-1 for turning on/off a normal FRC mode and an icon 140*b*-2 for turning on/off a fast FRC mode, and the user displays the displayed icon (by selecting 140*b*-1 and 140*b*-2), a desired mode can be turned on. When the normal FRC mode is on, the controller 120 can apply fixed image processing parameters regardless of the content type of the input image. For example, frame rate conversion may be performed using a fixed number of reference frames regardless of the content type of the input image. In addition, when the fast FRC mode is on, the controller 120 may determine image processing parameters based on the content type of the input image according to the above-described embodiment.

In addition, as illustrated in FIG. 18, it is also possible for the display 140 to display a scroll bar that allows the user to select the number of reference frames. The user can select the number of reference frames used for motion compensation by moving the scroll bar.

Hereinafter, an embodiment of a method of controlling a display apparatus according to an aspect will be described. In implementing the control method of the display apparatus according to an embodiment, the display apparatus according to the above-described embodiment may be used. Accordingly, the description of the display apparatus 100 described above with reference to FIGS. 1 to 18 may be applied to a control method of a display apparatus even if there is no special mention.

Figure 19:
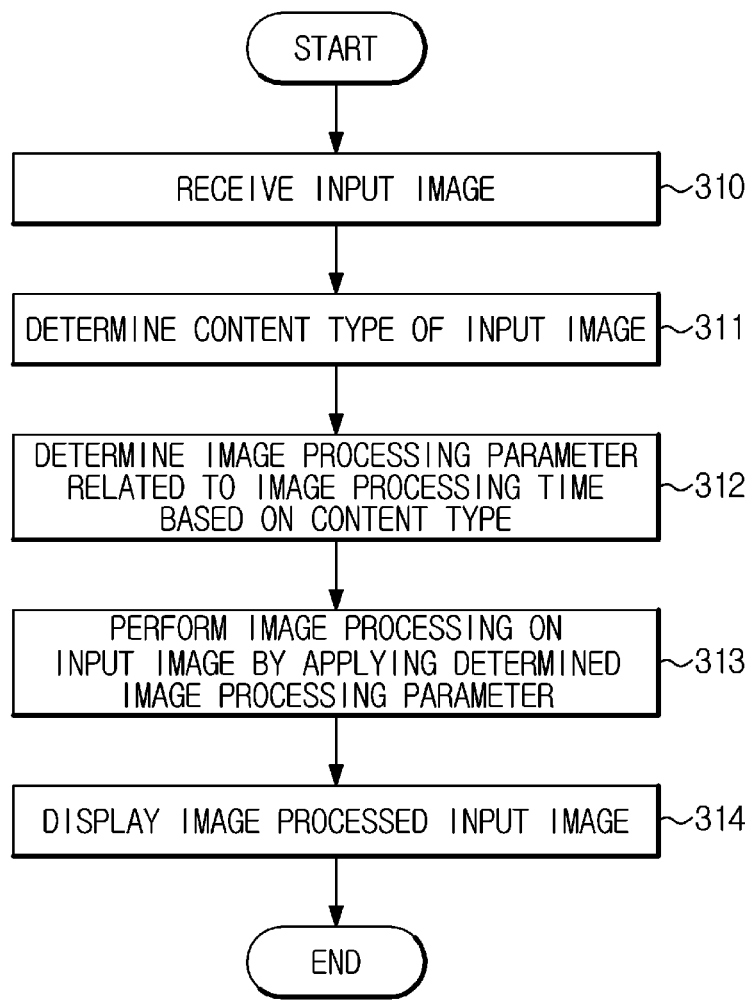
FIG. 19 is a flowchart illustrating a method of controlling a display apparatus according to an embodiment.

FIG. 19 is a flowchart illustrating a method of controlling a display apparatus according to an embodiment.

According to an embodiment of the control method of the display device illustrated in FIG. 19, an input image is received (310). The input image may be received from the external device 200 or an external server. The external device 200 and the display apparatus 100 may be connected by wire through a cable or may be connected through wireless communication. The input interface 110 provided in the display apparatus 100 may receive the input image, and if the input image is a compressed video, the input interface 110 may include a decoder to decode the compressed video.

The content type of the input image is determined (311). The controller 120 may analyze the input image to determine the characteristics of the input image, and determine the content type of the input image based on the characteristics of the input image. For example, the content type of the input video may be divided into a game and a general video, and the game may be further divided into various game genres such as FPS, Racing, RPG, RTS, and AOS. In addition, the general video may be divided into content such as sports broadcasts, movies, and general broadcasts. However, the above-described types of content are only examples applicable to the control method of the display device, and it is needless to say that other types of content may be applied. The description of the method for determining the content type based on the characteristics of the input image is as described in the embodiment of the display apparatus 100.

An image processing parameter related to the image processing time is determined based on the content type (312). When the content of the input image is a kind of content sensitive to frame delay, the controller 120 may determine the image processing parameter in a direction in which the image processing time is shortened. In addition, when the content of the input image is sensitive to the image quality and has no significant limitation on the image processing time, the image processing parameters may be determined so as to realize high image quality even when the image processing time is increased.

Image processing is performed on the input image by applying the determined image processing parameters related to the image processing time based on the content type (313). The controller 120 may perform the image processing according to a frame rate conversion algorithm on the input image to improve motion blur of the input image, and in performing the image processing, the image processing parameters determined according to the content of the input image may be applied.

The display 140 displays an image of the input on which the image processing has been performed (314).

Figure 20:
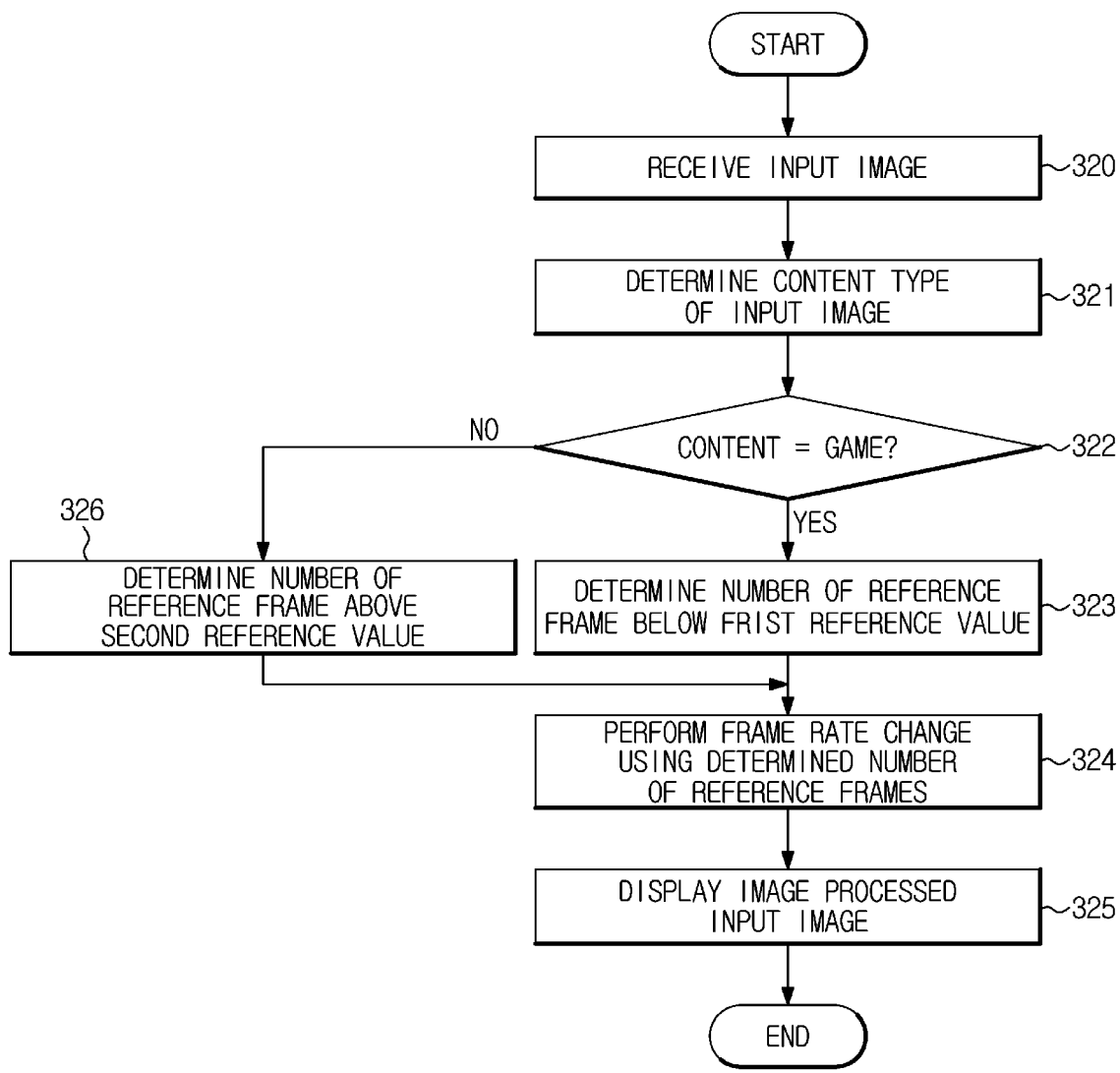
FIG. 20 is a flowchart illustrating a case in which an image processing parameter related to an image processing time includes the number of reference frames in a control method of a display apparatus according to an embodiment.

FIG. 20 is a flowchart illustrating a case in which an image processing parameter related to an image processing time includes the number of reference frames in a control method of a display apparatus according to an embodiment.

According to an embodiment of the control method of the display device illustrated in FIG. 20, an input image is received (320), and a content type of the input image is determined (321).

When the content of the input image is a game (YES in 322), the number of reference frames used for motion compensation may be determined to be less than or equal to the first reference value (323), and when the content of the input image is not a game (NO in 322), the number of reference frames used for motion compensation may be determined to be greater than or equal to the second reference value (326). The first reference value shall be equal to or greater than the second reference value.

In this example, the content of the input image is only divided into a game and a general video, but as described above, it is also possible to set the number of reference frames differently by dividing the game and the general video again in detail.

Frame rate conversion is performed using the determined number of reference frames (324). Specifically, the controller 120 may generate at least one interpolation frame using the determined number of reference frames and the motion vector, and insert it between the original frames.

According to the above-described display apparatus and its control method, when the content of the input video is a type sensitive to frame delay, such as a game, by setting the video processing parameter to shorten the video processing time compared to normal video content, it improves the response speed to the player's operation. Also, when the content of the input image is a kind sensitive to the image quality, a high quality image can be output by setting an image processing parameter capable of improving motion blur even if the image processing time is increased. Accordingly, the user's satisfaction can be improved by performing adaptive image processing according to the type of content output by the display apparatus.

The invention claimed is:

1. A display apparatus, comprising:
an input interface configured to receive an input image; and
a controller configured to determine an image processing parameter based on at least one characteristic of the input image, control an image processing time for the input image in response to the determined image processing parameter, and generate an interpolation frame based on the image processing parameter,
wherein the image processing parameter related to the image processing time comprises a number of reference frames used to generate the interpolation frame,
wherein the controller is further configured to control the image processing time for the input image by adjusting the number of reference frames used to generate the interpolation frame,
wherein when the content type of the input image is a game, the controller is further configured to determine the image processing parameter such that the image processing time is shorter than when a content type of the input image is a normal video rather than the game, and
wherein the controller is further configured to adjust the number of the reference frames to be smaller than when the content type of the input image is the normal video when the content type of the input image is the game.

2. The display apparatus of claim 1, wherein the controller is further configured to determine the content type of the input image based on the at least one characteristic of the input image, and to determine the image processing parameter based on the determined content type.

3. The display apparatus of claim 2, wherein when the content type of the input image is a game, the controller is further configured to determine a game genre of the input image based on the at least one characteristic of the input image.

4. The display apparatus of claim 3, wherein the controller is further configured to determine the image processing parameter related to the image processing time based on the game genre of the input image.

5. The display apparatus of claim 1, wherein the controller is further configured to determine whether the input image is a sports broadcast based on the at least one characteristic of the input image when the content type of the input image is the normal video, and to determine the image processing parameter such that the image processing time is shorter than when the input image is not the sports broadcast when the input image is the sports broadcast.

6. The display apparatus of claim 1, wherein the controller is further configured to perform image processing according to a Frame Rate Conversion algorithm.

7. The display apparatus of claim 1, wherein the controller is further configured to determine the number of the reference frames to be less than or equal to a predetermined first reference value when the content type of the input image is the game.

8. The display apparatus of claim 1, wherein the controller is further configured to determine the number of the reference frames to be greater than or equal to a predetermined first reference value when the content type of the input image is not the game.

9. The display apparatus of claim 1, further comprising:
a user input for receiving a selection of the image processing parameter related to the image processing time from a user.

10. The display apparatus of claim 1, further comprising:
a display for displaying the input image on which image processing has been performed.

11. A controlling method of a display apparatus, the method comprising:
receiving an input image;
determining an image processing parameter related to an image processing time based on at least one characteristic of the input image;
controlling the image processing time for the input image in response to the determined image processing parameter, and
generating an interpolation frame based on the image processing parameter,
wherein the image processing parameter related to the image processing time comprises a number of reference frames used to generate the interpolation frame,
wherein the method further comprises controlling the image processing time for the input image by adjusting the number of reference frames used to generate the interpolation frame,
wherein the determining the image processing parameter further comprises determining the image processing parameter such that the image processing time is shorter than when a content type of the input image is a normal video rather than a game when the content type of the input image is the game, and
wherein adjusting the number of reference frames used to generate the interpolation frames comprises adjusting the number of the reference frames to be smaller than when the content type of the input image is the normal video when the content type of the input image is the game.

12. The method of claim 11, wherein the determining the image processing parameter comprises determining the content type of the input image, and determining the image processing parameter based on the determined content type.

* * * * *